F. N. KELSEY.
AUTOMATIC TIRE ALARM.
APPLICATION FILED JULY 20, 1914.
1,191,318.
Patented July 18, 1916.
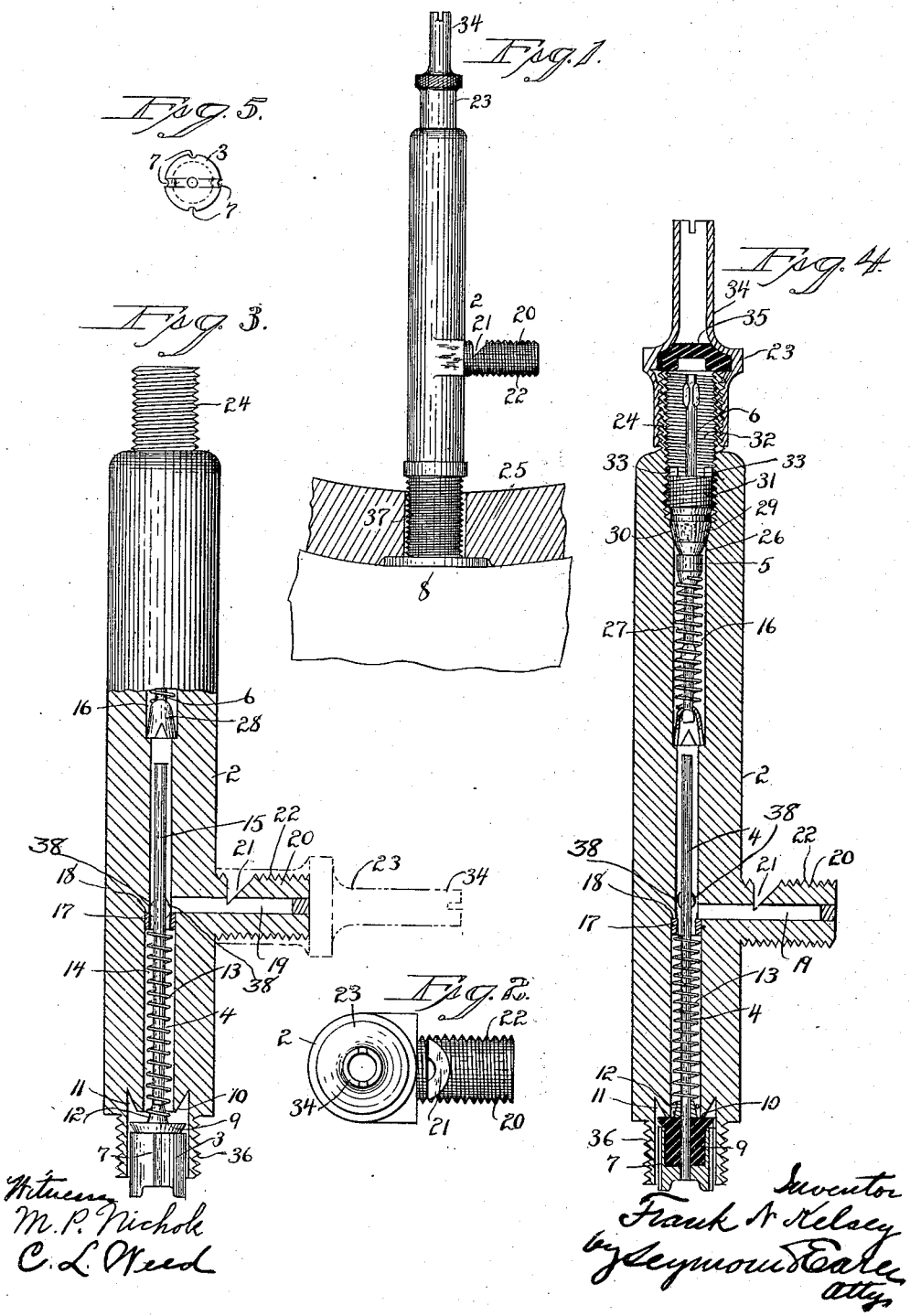

UNITED STATES PATENT OFFICE.

FRANK N. KELSEY, OF NEW HAVEN, CONNECTICUT, ASSIGNOR TO ARCHIBALD H. BOWDITCH, OF NEW HAVEN, CONNECTICUT.

AUTOMATIC TIRE-ALARM.

1,191,318.  Specification of Letters Patent.  Patented July 18, 1916.

Application filed July 20, 1914. Serial No. 851,968.

*To all whom it may concern:*

Be it known that I, FRANK N. KELSEY, a citizen of the United States, residing at New Haven, in the county of New Haven and State of Connecticut, have invented a new and useful Improvement in Automatic Tire-Alarms; and I do hereby declare the following, when taken in connection with the accompanying drawings and the characters of reference marked thereon, to be a full, clear, and exact description of the same, and which said drawings constitute part of this application, and represent, in—

Figure 1 a view in side elevation of an automatic audible signal valve constructed in accordance with my invention and shown as applied to the inner tube of an automobile wheel tire. Fig. 2 a detached plan view of the valve. Fig. 3 a detached view of the valve partly in side elevation and partly in vertical section shown on the scale of Fig. 2 and with the signal valve in its open position. Fig. 4 a view of the valve in longitudinal section with the signal valve in its closed or normal position. Fig. 5 a detached reverse plan view of the signal valve proper.

My invention relates to an improvement in automatic audible signal valves for indicating the deflation of pneumatic tires, the object being to provide simple and reliable means for informing the occupant or occupants of an automobile or other pneumatic-tired vehicle, the moment that any one of its tires falls in air-pressure below a predetermined safety line, whereby the occupant or occupants of the vehicle are relieved of the necessity of watching the tires and the tires are prevented from being damaged by being run when too soft.

With these ends in view my invention consists in an audible signal valve for pneumatic tires, the said valve having certain details of construction and combinations of parts as will be hereinafter described and pointed out in the claims.

In carrying out my invention as herein shown, I employ a valve-body 2 made long enough to receive a signal valve 3 and its stem 4 in addition to an air-valve 5 and its long stem 6, the air-valve 5 and its related parts being of any approved construction. The signal-valve 3 is formed upon its periphery with air-passages 7 through which the air passes into and from the inner tube 8 of any pneumatic tire. The said valve 3 is chambered to receive a rubber gasket 9 the flaring inner end of which co-acts with an annular valve-seat 10 produced by making a V-shaped annular groove 11 in the inner end of the valve-body 2. The inner end of the valve-stem 4 is permanently fastened to the inner end of the valve 3 as shown in Fig. 4, in any convenient manner, the said stem 4 passing through the center of the gasket 9 and upon the top or upper surface of the latter rests a collar 12 fastened to the stem 4 and forming an abutment for the lower end of a helical spring 13 encircling the stem 4 and located in a spring-chamber 14 formed by enlarging or counterboring the inner portion of the air-passage, the latter extending throughout the length of the valve-body 2. The said longitudinal air-passage also comprises a central portion 15 and an enlarged or counterbored outer portion forming the chamber 16 of the air-valve 5. The outer end of the said spring 13 impinges against a washer 17 located at the extreme upper end of the spring-chamber 14 and abutting against a shoulder 18 resulting from making the said chamber 14 larger than the portion 15 of the air-passage. Intersecting the inner end of the passage 15 at a right angle thereto is a signal port or passage 19 formed in a lateral signal nipple 20 made integral with the valve-body 2 near the inner end thereof, and furnished with a transverse signal-orifice 21 which is shaped to produce a continuous whistling sound when air under pressure escapes through it, or the said port 19 might be furnished with an ordinary reed, the character of the signal being immaterial as long as it is audible and calculated to attract attention. The said nipple 20 is formed with external threads 22 for the temporary application of the cap 23 of the valve, the said cap 23 being removed from the ordinary inflation-nipple 24 at the outer end of the valve-body 2 preparatory to "blowing up" or inflating the tire 8 and applied to the said signal nipple 22 so as to close the orifice 21 and thus prevent the escape of air through the same during the inflation operation.

The spring 13, it may now be mentioned, is constructed so as to push the gasket 9 of the valve 3 away from the valve-seat 10 the moment the air-pressure within the tube 8 falls below a predetermined point established as the point of safety below which the pressure in the inner tube 8 cannot go without danger of cutting the shoe (not shown) and the said inner tube by the rim of the wheel 25. When the air-pressure within the tube 8 falls below this predetermined safety point, the spring 13 asserts itself to open the valve 3, whereupon the air under pressure within the tube 8 will rush through the spring-chamber 14 into the signal port 19 and thence out through the orifice 21 with the production of an audible signal of a character to immediately attract the attention of the occupant or occupants of the vehicle. Of course the spring 13 may be constructed so as to vary the degree of air-pressure at which the signal will be sounded, all dependent upon the character of the tire and wheel and the circumstances of intended use.

The air-valve 5 and its related parts may be of any approved construction. As shown, the valve 5 is an ordinary check-valve and need not be described more than to say that, as usual, its parts are organized together so as to be applied and removed as one piece. The said valve 5 is loosely mounted upon its stem 6 about midway the length thereof, and is normally held upon a conical valve-seat 26 by means of a helical spring 27 located in the chamber 16 and abutting at its outer end upon the tapered lower end of the valve and at its inner end upon the tapered outer end of a notched, flaring cap 28 mounted upon the inner end of the stem 6 which is spread to retain it in place. The tapering outer end of the valve-seat 26 is provided with a gasket 29 which is crowded upon a bevel 30 in the valve-body 2 by means of a threaded plug 31 located in the bottom of an internally threaded chamber 32 formed partly in the inflation nipple 24 and partly in the outer end of the valve-body. The said plug is furnished with assembling lugs 33 by which it is adapted to be screwed into and removed from place by the slotted outer end 34 of the cap 23, which, for this purpose, is reversed end for end. The said cap 23, as shown, is furnished with a rubber washer 35 which when the cap is in place, effectively stops the passage of air through the valve-body 2. At its inner end the valve-body is furnished with an externally threaded nipple 36 adapting it to be screwed into an internally threaded nipple 37 permanently mounted in the usual manner in the inner tube 8.

Since the valve stems 4 and 6 are in line and nearly in abutment, it will be clear that when the stem 6 is pushed inward for the deflation of the tube 8, its inner end will co-act with the adjacent end of the stem 4 in crowding the latter inward and opening the signal-valve 3.

In using my improved valve for the inflation of the inner tube 8, the cap 23 is removed from the inflation-nipple 24 of the valve-body and applied to the signal-nipple 22 thereof, whereby the whistle orifice 21 is closed and sealed. The nipple of the air-pump tube (not shown) is now applied either to the outside or inside, as the case may be, of the nipple 24 and air under pressure forced through the valve-body 2 into the inner tube 8. Each stroke of the pump forces the air-valve 5 open, the signal-valve 3 meanwhile being held open by its spring 13 until after the pressure in the tube 8 has passed the point where it overcomes the tension of the said spring 13. From this time forward both valves will be opened by each stroke of the pump and closed at the end of each stroke thereof, the air-valve 5 being closed by the power of its spring 27 in conjunction with the air-pressure and the signal-valve 3 being closed by the air-pressure against the tension of its spring 13. When the tire has been inflated to the pressure required, the nipple of the air pump tube is disengaged from the inflation-nipple 24 and the cap 23 removed from the signal-nipple 22 and replaced upon the said nipple 24. The valve stem 4 is provided, as usual, with oppositely located retaining-nibs 38 which prevent the escapement of the washer 17 and the spring 13 after the same have been assembled on the stem 4.

When in case of a puncture or a leak, the air-pressure within the inner tube 8 falls below the predetermined power of the spring 13, the same will act to open the signal-valve 3 which will be followed by a rush of air under pressure through the signal port 19 and the continuous sounding of an audible signal which will notify the occupant or occupants of the vehicle that the pressure of air in the tire signaling has fallen below the safety point. No air can possibly escape at this time through the air-valve 5 so that the full pressure of air in the tube 8 is utilized for signaling to the occupant or occupants of the vehicle which will be stopped and the tire re-inflated or replaced before any further damage has been done.

I claim:—

1. In an automatic audible signal valve for indicating the deflation of pneumatic tires, the combination with a valve-body having a longitudinal air-passage and a signal-nipple, of an air-check-valve located in the outer end of the said body, a signal valve located in the inner end of the said body, co-acting stems for the respective valves, and a cap normally mounted upon the valve-body to close the outer end of its air-passage and adapted to be temporarily utilized as a closure for the said signal-nipple during the inflation of the tire.

2. In an automatic audible signal valve for indicating the deflation of pneumatic tires, the combination with a valve-body provided at its outer end with an inflation nipple and with a lateral signal nipple, of an air-check-valve and a signal valve mounted in the said body, co-acting stems for the said valves, a spring for opening the signal valve when the pressure within the tire falls below a predetermined point, and means for sealing the signal nipple when the air-valve is being utilized for inflating the tire.

In testimony whereof, I have signed this specification in the presence of two subscribing witnesses.

FRANK N. KELSEY.

Witnesses:
M. P. NICHOLS,
GEORGE D. SEYMOUR.

Copies of this patent may be obtained for five cents each, by addressing the "Commissioner of Patents, Washington, D. C."